(12) United States Patent
Hesson et al.

(10) Patent No.: US 6,232,975 B1
(45) Date of Patent: May 15, 2001

(54) REVERSE DAYLIGHTING FUNCTION FOR COMPUTER-GENERATED IMAGES

(75) Inventors: Kevin Mark Hesson, St. George, UT (US); John Murchie Lewis, Acton, MA (US); Christopher Eric Putnam, Henniker, NH (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/136,633

(22) Filed: Aug. 19, 1998

(51) Int. Cl.[7] .................................................. G06T 15/00

(52) U.S. Cl. ............................................................. 345/419

(58) Field of Search ..................................... 345/418, 419, 345/421, 423, 424, 425, 426, 427, 432

(56) References Cited

U.S. PATENT DOCUMENTS

| | | | |
|---|---|---|---|
| 5,872,902 | * | 2/1999 | Kuchkuda et al. ................... 345/430 |
| 5,966,673 | * | 10/1999 | Shannon, Sr. ........................... 702/35 |
| 6,014,343 | * | 1/2000 | Graf et al. ............................... 367/38 |

* cited by examiner

*Primary Examiner*—Cliff N. Vo
(74) *Attorney, Agent, or Firm*—Gates & Cooper LLP (57) ABSTRACT

A method, apparatus and article of manufacture for creating daylighted objects by drawing projection lines from an intersection of two objects. Once the intersection between a plane of one object and a face or plane of another object is determined, a polyline with at least one vertex is created comprising at least one edge of the intersection of the plane and the face. Projection lines are then drawn from each vertex of the polyline to the object such that the projection lines intersect the object.

24 Claims, 6 Drawing Sheets

REVERSE DAYLIGHTING FUNCTION FOR COMPUTER-GENERATED IMAGES

BACKGROUND OF THE INVENTION

1. Field of the Invention

This invention relates in general to three dimensional (3D) computer aided design (CAD) systems, and more particularly, to a method, apparatus and article of manufacture for generating reverse daylighting on a surface on a computer-generated image.

2. Description of Related Art

Daylighting of surfaces is used in 3D CAD systems to illustrate to the user the shape of a surface and to indicate the projection of a surface from an intersecting point or line.

Present methods require the user to perform additional operations, such as adding vertices on entities or objects within the drawing to define the resolution for the daylighting. For large objects being daylighted, the extra operation of adding vertices requires additional user time to create the completed CAD drawing, making the CAD drawing more expensive and more time consuming to complete.

Further, volume calculations are performed using the daylighted projection lines. The use of too few or too many vertices as described above will affect the precision and accuracy of volume calculations performed by the computer.

It can be seen, then that there is a need in the art for a more uniform method for creating daylighted objects. It can also be seen, then, that there is a need in the art for a daylighting method that is faster and less expensive. It can also be seen that there is a need in the art to improve the accuracy of volume calculations by creating a uniform method for creating daylighted objects.

SUMMARY OF THE INVENTION

To overcome the limitations in the prior art described above, and to overcome other limitations that will become apparent upon reading and understanding the present specification, the present invention discloses a method, apparatus and article of manufacture for daylighting a base object with a computer by creating projection lines. The origination points of the projection lines are determined by determining intersections between a plane of the base object and a first object, between the plane of the base object and an edge between a face of the first object and a face of a second object, and the plane of the base object with at least one other object, the intersection points being vertices. A network surface is created by connecting the vertices, and the projection lines are drawn from each vertex of the network surface to the base object such that the projection line intersects the base object.

The general object of the present invention is to daylight an object. The specific objects of the invention are to provide a method for daylighting an object consistently, while using fewer computer resources and less user interface time to create the daylighted surface.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Present methods for daylighting objects create vertices or origination points for projection lines along an object. The projection lines start from the entity and continue along the object's planar or curvilinear surface until they intersect another object. This requires the user to create the individual vertices for generation of the projection lines.

The present invention approaches the subject of daylighting as a planar intersection instead of a line intersection with a plane. Rather than approaching daylighting from the vertices on the object, the present invention approaches daylighting a surface from the reverse angle, in other words, from the intersection vertices of the intersected object with the base object. This intersection is typically called a Triangular Irregular Network (TIN) surface. Since the TIN surface is a triangulated surface, it naturally lends itself to a plane intersection approach. The present invention begins with a known point and direction on the intersected object, and then determines where the projected plane of the initial object will intersect the intersected object (typically an edge of the initial object will intersect a face of the intersected object). Once the initial intersection point is known, adjacent faces are checked to find if they have intersection points with the initial object. The resulting intersection points and edges are connected to form a three-dimensional piecewise linear line (also known as a polyline). The vertices of the polyline are used as the starting points for the projection lines, which are projected back to the initial object. The projection lines are thus consistently generated and perpendicularly intersect the initial object, which creates a matching, uniform resolution of the surface while using less central processing unit (CPU) time.

Hardware Environment

Figure 1:
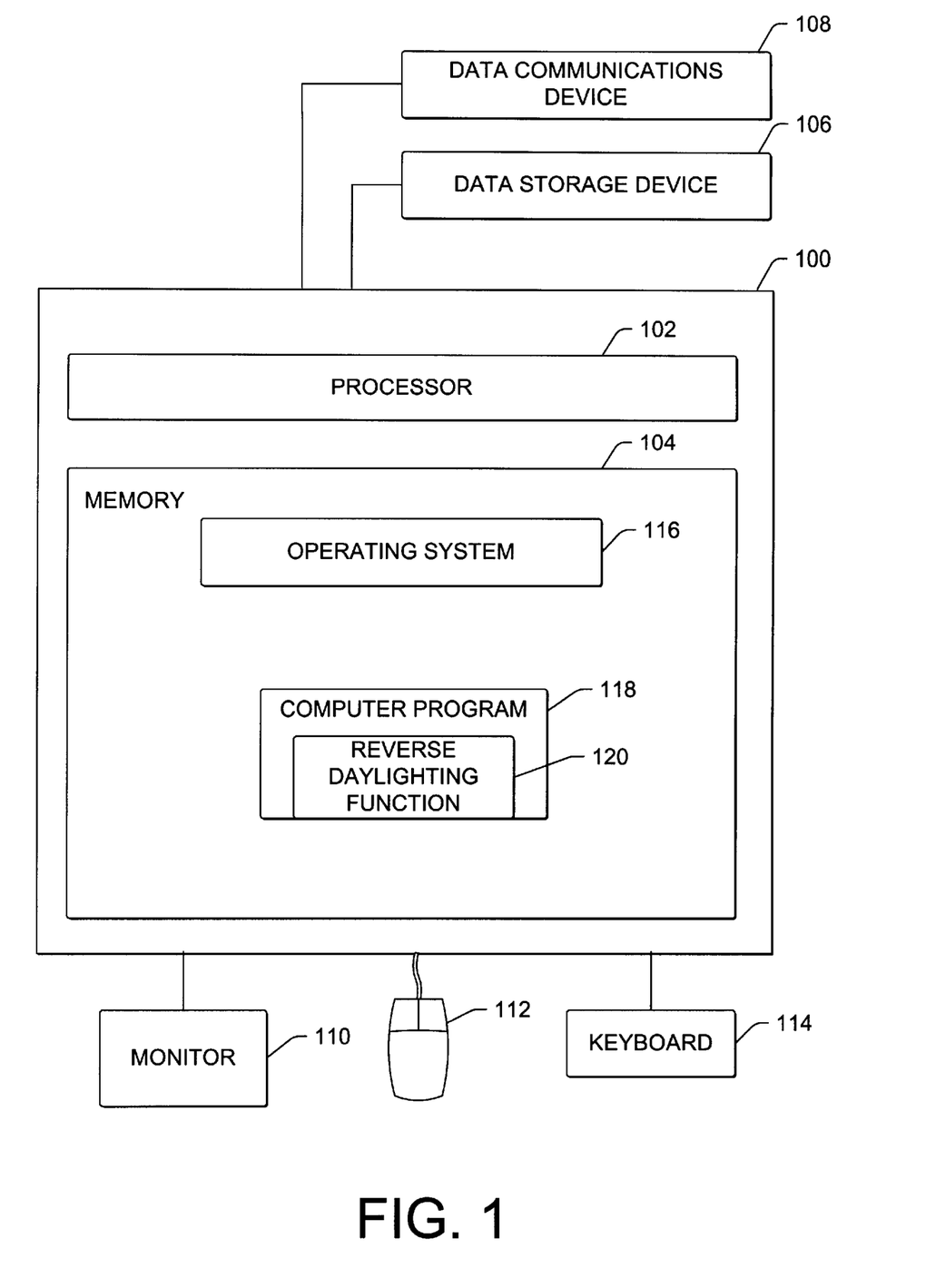
FIG. 1 illustrates an exemplary computer hardware environment that could be used with the present invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, holographic display device, etc.), mouse pointing device 112 and keyboard 114. It is envisioned that attached to the personal computer 100 may be other devices such as read only memory (ROM), a video card, bus interface, printers, etc. Any combination of the above components, or any number of different components, peripherals, and other devices, may be used with the computer 100 without departing from the scope of the present invention. For purposes of clarity and completeness, references herein to monitor 110 encompass and include additional references to holographic display devices, goggles, and helmets as well as video monitors.

The personal computer 100 usually operates under the control of an operating system 116. The present invention is usually implemented in one or more computer programs 118 that operate under the control of the operating system 116. The computer program 118 is usually a CAD program or other graphics program. In the preferred embodiment, the computer program 118 includes a reverse daylighting function 120.

Generally, the computer program 118 and reverse daylighting function 120 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Many modifications may be made to this configuration without departing from the scope of the present invention.

The present invention also teaches that any combination of the above components, or any number of different components, including computer programs, peripherals, and other devices, may be used to implement the present invention, so long as similar functions are performed thereby. The presentation of the computer system as described in FIG. 1 is not meant to limit the scope of the present invention, but to illustrate one possible embodiment of the present invention.

Operation of the Reverse Daylighting Function

Figure 2A:
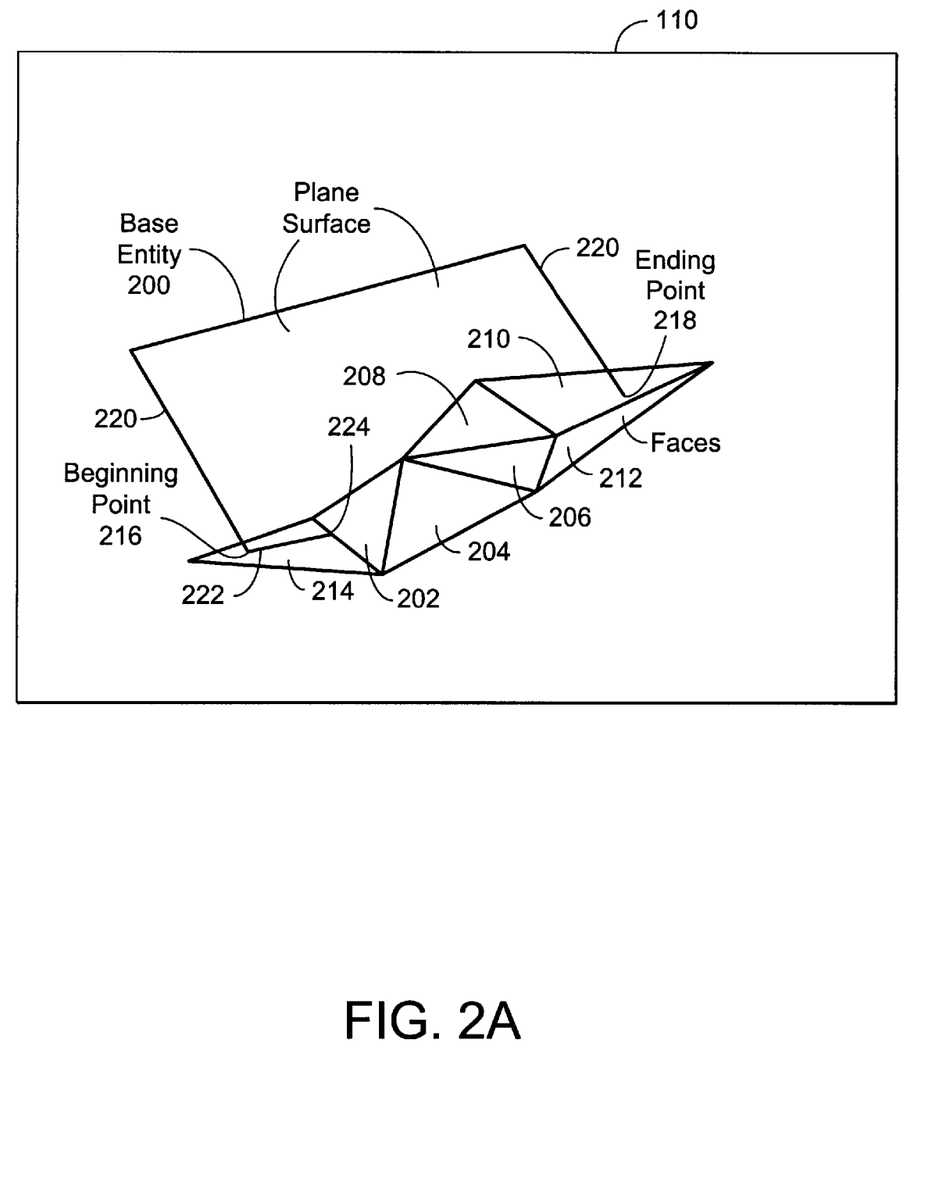
FIGS. 2A–2C are perspective drawings which show a daylighted object created with the present invention.
Figure 2B:
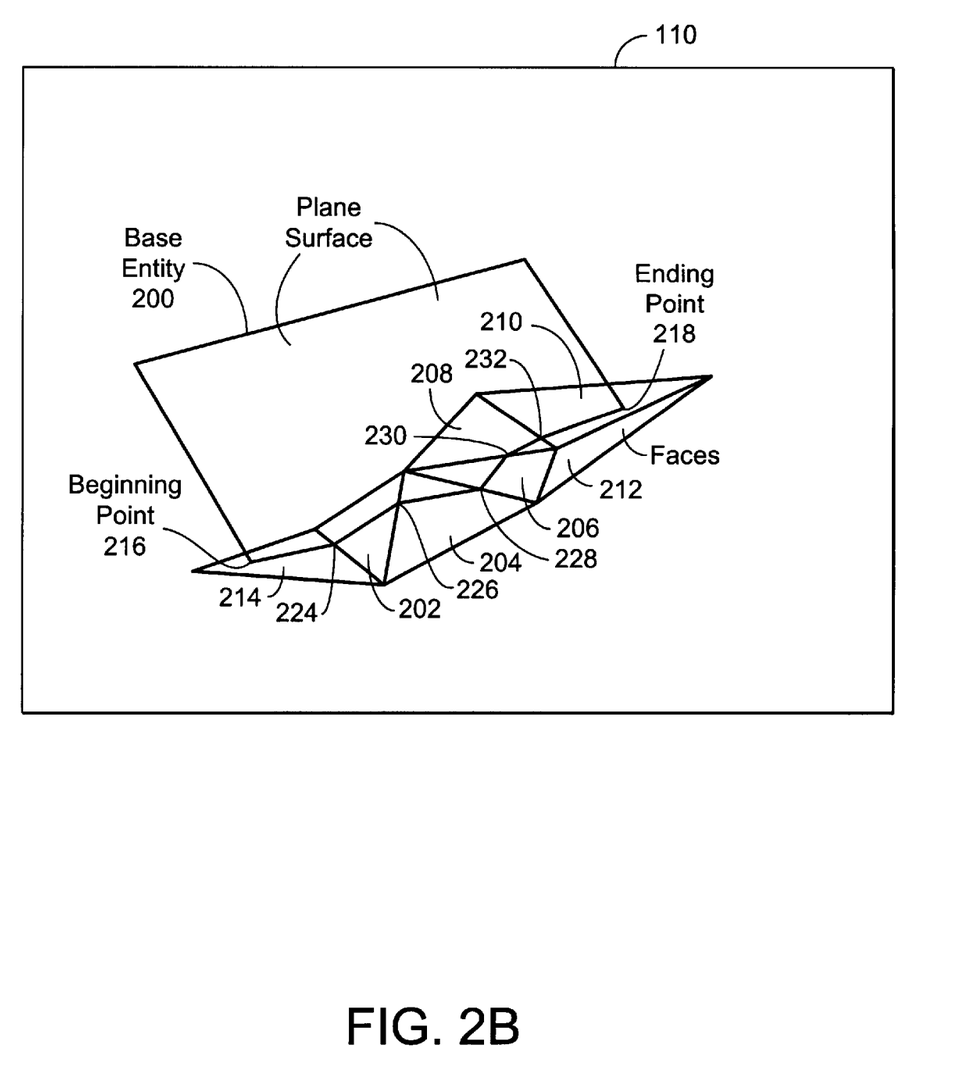
Figure 2C:
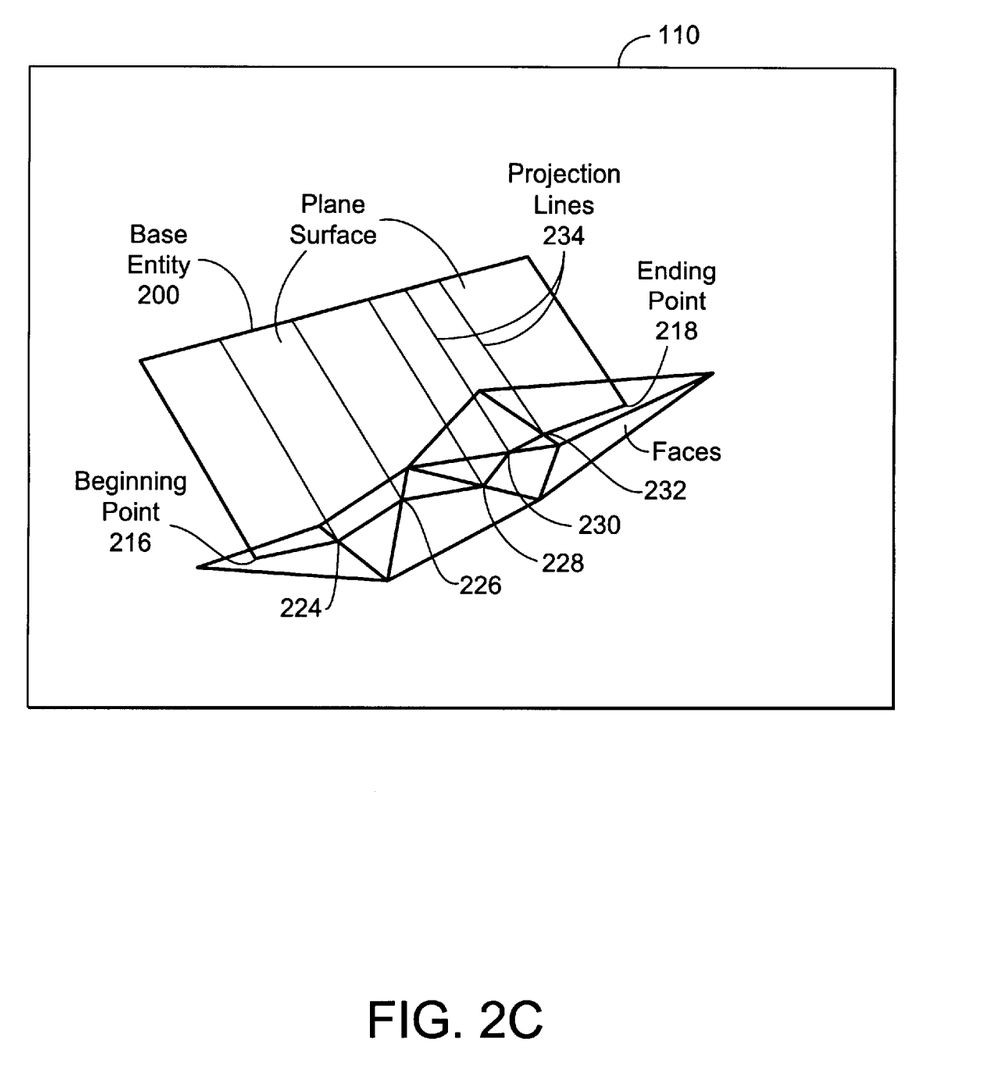

FIGS. 2A–2C illustrate the reverse daylighting function 120 of the present invention.

Referring initially to FIG. 2A, base entity (object) 200 is a line segment whose projected plane intersects faces 202, 204, 206, 208, 210, and 214 as shown on monitor 110. The base entity 200 is not limited to being a line segment; base entity 200 can be a curved surface, a line, a polyline, an arc, a spiral, a plane, or a point.

Beginning point 216 and ending point 218 are generated where perpendicular extensions 220 of the base entity 200 intersect the remaining faces in the CAD drawing. The extensions will vary depending on the type of base entity 200 (plane, curve, etc.). Beginning point 216 and ending point 218 are interchangeable; the method of the present invention can start at either point without departing from the scope of the present invention. Beginning point 216 and ending point 218 are labeled to ease the understanding of the present invention and are not meant to limit the scope of the present invention.

Once beginning point 216 is determined on face 214, the line 222 is generated by determining where the edge of base entity 200 intersects the edge between face 214 and the adjacent face, face 202. By connecting beginning point 216 and vertex 224, line 222 is generated.

FIG. 2B illustrates the generation of the remainder of line 222. By continuing the determination of where the edge of base entity 200 intersects the edge between adjacent faces, line 222 is generated. Once vertex 224 is determined, face 204, which is adjacent to face 202, is checked for an intersection of base entity 200 with face 204 at the edge of face 204. This verification generates vertex 226. This process is repeated for all of the faces 202–214, and generates vertices 224–232. Note that face 212 does not have an intersection with base entity 200.

Once all of the vertices 224–232 are generated, line 222 is generated by connecting all of the vertices 224–232. The line 222 is typically a polyline, but can be other types of geometric constructs depending on the vertices 224–232 that are generated.

FIG. 2C illustrates the projection lines that generate the reverse daylighting of the present invention. Projection lines 234 are generated by drawing a line from the vertices 224–232 back to the base entity 200. The projection lines 234 can be drawn in the planar surface of base entity 200 for base entities 200 that are planar or linear in nature, but are not required to be within the planar surface. For example, projection lines 234 can be generated by a series of interpolations from a beginning slope at line 222 to an ending slope at base entity 200. Further, multiple points between the base entity 200 and the line 222 can be defined to have specific slopes, or a geometric expression can be defined for the slopes of the projection lines 234 to define the shapes of the projection lines 234. For base entity 200 that is an arc, a conic section is used to determine the intersection between the vertices 224–232 and the base entity 200, similar to an intersection between a line and a conic section, to produce the projection lines 234. For a base entity 200 that is a spiral, the projection lines 234 would follow a spiral path with a constant slope. Other types of projection lines 234 can be produced by the present invention, and the examples for planes, arcs, and spirals are for purposes of illustration only and not meant to limit the scope of the present invention. Once projection lines 234 intersect base entity 200, the projection lines 234 are terminated on base entity 200.

Once the projection lines 234 are created, the base entity 200, the line 222, the extensions 220, and the projection lines 234 can be combined to generate a grading surface 236. The grading surface 236 can be transformed into a triangular irregular network surface, which can be used to generate slopes, positions, volume calculations, and other information to assist the user in generating accurate information from the drawing.

Figure 3:
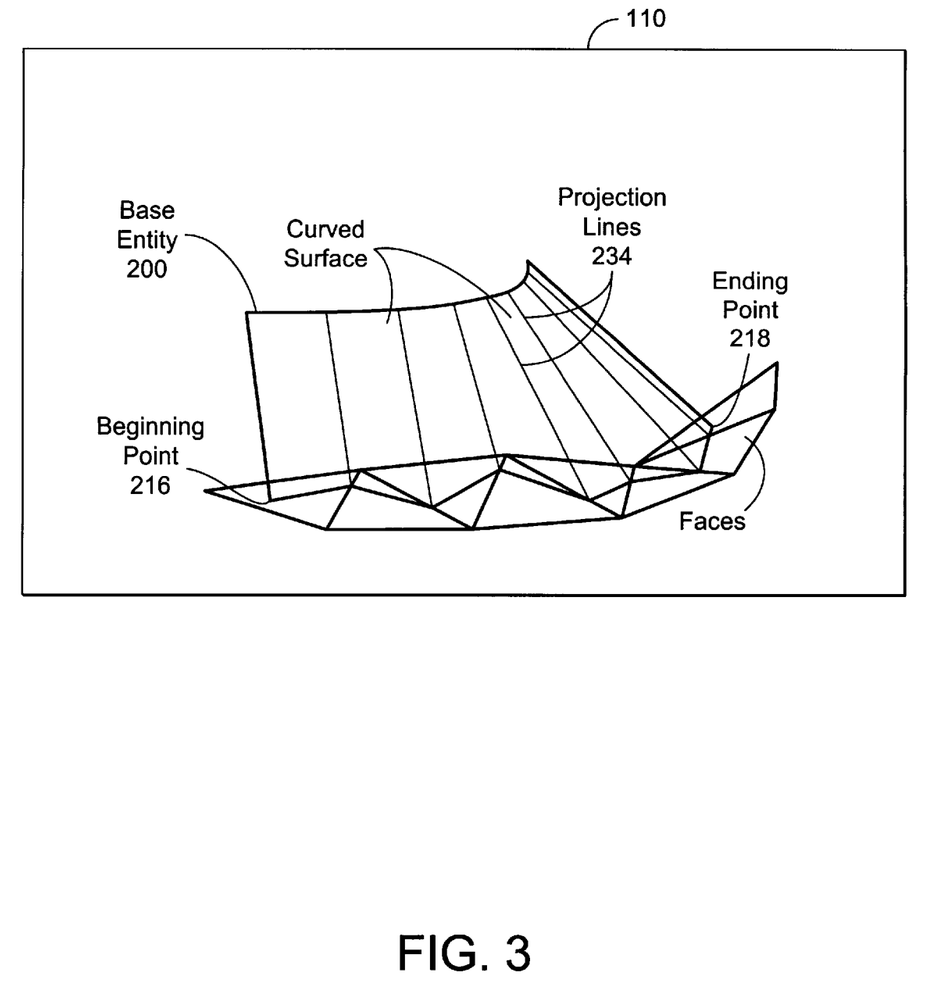
FIG. 3 is a perspective drawing which shows a daylighted curved object created with the present invention.

FIG. 3 illustrates a curved surface that has been reverse daylighted by the present invention. In a similar manner to that described in FIGS. 2A–2C, projection lines 234 are generated for a curved base entity 200 as shown in FIG. 3. Note that projection lines 234 are no longer within the planar surface of base entity 200, because base entity 200 is no longer planar in nature.

Logic of the Reverse Daylighting Function

Figure 4:
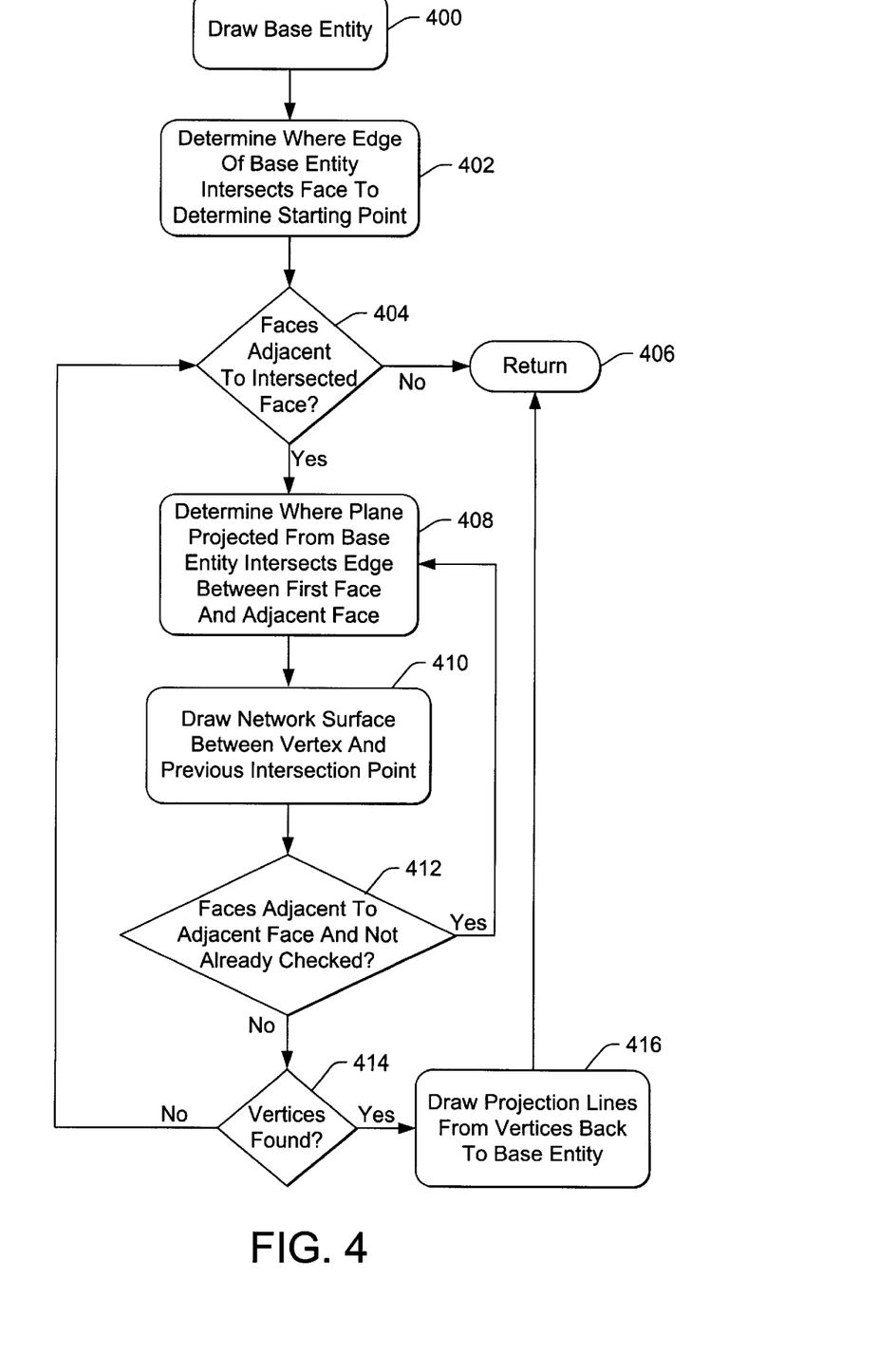
FIG. 4 is a flowchart that illustrates the general logic of the reverse daylighting function of the present invention.

FIG. 4 is a flowchart that illustrates the general logic of the reverse daylighting function 120 according to the present invention.

Block 400 represents the computer program 118 selecting or drawing the base entity 200 on the monitor 110 of the computer 100.

Block 402 represents the computer program 118 determining where the edge of the base entity intersects a face to determine the starting point 216.

Block 404 is a decision block that represents the computer program 118 determining if there are faces adjacent to the intersected face.

If there are no adjacent faces, control passes to block 406, where control is returned to block 400.

If there are adjacent faces to the intersected face, control passes to block 408, which represents the computer program 118 determining where the plane projected from the base entity intersects the edge between the previous face and the adjacent face.

Control then passes to block 410, where the line 222 is drawn from the first point to the vertex.

Control then passes to decision block 412, which checks the remainder of the faces in the CAD drawing.

If there are additional adjacent faces that have not been checked, control passes back to block 408, otherwise, control passes to decision block 414.

Block 414 is a decision block that represents the computer program 118 determining if there were any vertices 224–232 found by the reverse daylighting function 120.

If so, control passes to block 416, where projection lines 234 are drawn from the line 222 back to the base entity 200.

Otherwise, control passes back to block 404, indicating that there was not an intersection of the base entity 200 and the selected face for that traversal of the logic.

Conclusion

This concludes the description of the preferred embodiment of the invention. In summary, the present invention discloses a method, apparatus and article of manufacture for daylighting a base object with a computer by creating projection lines. The origination points of the projection lines are determined by determining intersections between a plane of the base object and a first object, between the plane of the base object and an edge between a face of the first object and a face of a second object, and the plane of the base object with at least one other object, the intersection points being vertices. A network surface is created by connecting the vertices, and the projection lines are drawn from each vertex of the network surface to the base object such that the projection line intersects the base object.

The following describe some alternative ways of accomplishing the present invention. For example, different computer programs, operating environments, and operating systems can be substituted for those described herein. In addition, the present invention can use any type of computer, and need not be limited to a personal computer. The present invention can also use any type of graphics system, and need not be limited to the example described herein. Further, alternate approaches could be substituted for the logic described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of reverse daylighting an object in a computer-generated image of a computer-aided design system (CAD), comprising:
   (a) determining a first intersection point where an initial object intersects an intersected object;
   (b) checking at least one object adjacent to the intersected object to find additional intersection points with the initial object;
   (c) connecting the intersection points together to form a polyline; and
   (d) using vertices of the polyline as starting points for projection lines projected back to the initial object.

2. The method of claim 1, wherein the projection line perpendicularly intersects the base object.

3. The method of claim 2, wherein the projection line terminates on the base object.

4. The method of claim 1, wherein the base object is selected from a group comprising a plane, a line, a polyline, an arc, a curved surface, a spiral, and a point.

5. The method of claim 1, wherein the projection lines are consistently generated and perpendicularly intersect the initial object, which creates a matching, uniform resolution of the surface.

6. The method of claim 1, wherein the polyline is a three-dimensional piecewise linear line.

7. The method of claim 1, further comprising determining a direction of intersection of the initial object from the first intersection point, wherein the direction of intersection determines an order of checking adjacent objects.

8. The method of claim 1, wherein connecting the intersection points connects one of the intersection points to the adjacent intersection point.

9. An apparatus for reverse daylighting an object in a computer-generated image of a computer-aided design system (CAD), the apparatus comprising:
   (a) a computer, comprising a processor and a memory storing an initial object and at least an intersected object, and an object adjacent to the intersected object;
   (b) means, performed by the computer, for determining a first intersection point where the initial object intersects the intersected object;
   (c) means, performed by the computer, for checking at least one object adjacent to the intersected object to find additional intersection points with the initial object;
   (d) means, performed by the computer, for connecting the intersection points together to form a polyline; and
   (e) means, performed by the computer, for using vertices of the polyline as starting points for projection lines projected back to the initial object.

10. A program storage device, readable by a computer having a processor, a memory, and a display device, tangibly embodying one or more programs of instructions executable by the computer in a computer-aided design system (CAD) to perform method steps of generating a daylighted surface for display on the display device, the method comprising:
   (a) determining a first intersection point where an initial object intersects an intersected object;
   (b) checking at least one object adjacent to the intersected object to find additional intersection points with the initial object;
   (c) connecting the intersection points together to form a polyline; and
   (d) using vertices of the polyline as starting points for projection lines projected back to the initial object.

11. The apparatus of claim 9, wherein the projection line perpendicularly intersects the base object.

12. The apparatus of claim 11, wherein the projection line terminates on the base object.

13. The apparatus of claim 9, wherein the base object is selected from a group comprising a plane, a line, a polyline, an arc, a curved surface, a spiral, and a point.

14. The apparatus of claim 9, wherein the projection lines are consistently generated and perpendicularly intersect the initial object, which creates a matching, uniform resolution of the surface.

15. The apparatus of claim 9, wherein the polyline is a three-dimensional piecewise linear line.

16. The apparatus of claim 9, further comprising means for determining a direction of intersection of the initial object from the first intersection point, wherein the direction of intersection determines an order of checking adjacent objects.

17. The apparatus of claim 9, wherein the means for connecting the intersection points connects one of the intersection points to the adjacent intersection point.

18. The program storage device of claim 10, wherein the projection line perpendicularly intersects the base object.

19. The program storage device of claim 18, wherein the projection line terminates on the base object.

20. The program storage device of claim 10, wherein the base object is selected from a group comprising a plane, a line, a polyline, an arc, a curved surface, a spiral, and a point.

21. The program storage device of claim 10, wherein the projection lines are consistently generated and perpendicularly intersect the initial object, which creates a matching, uniform resolution of the surface.

22. The program storage device of claim 10, wherein the polyline is a three-dimensional piecewise linear line.

23. The program storage device of claim 10, the method further comprising determining a direction of intersection of the initial object from the first intersection point, wherein the direction of intersection determines an order of checking adjacent objects.

24. The program storage device of claim 10, wherein connecting the intersection points connects one of the intersection points to the adjacent intersection point.

* * * * *